United States Patent [19]

Strosser

[11] Patent Number: 5,600,942
[45] Date of Patent: Feb. 11, 1997

[54] ADAPTIVE THRESHOLDING FOR METAL DETECTION

[75] Inventor: Richard P. Strosser, Akron, Pa.

[73] Assignee: New Holland North America, Inc., New Holland, Pa.

[21] Appl. No.: 414,329

[22] Filed: Mar. 31, 1995

[51] Int. Cl.[6] .................................................. A01D 75/18
[52] U.S. Cl. ........................... 56/10.25; 56/10.3; 340/684
[58] Field of Search .............................. 56/10.25, 10.2 R, 56/10.3, DIG. 15; 460/2, 3; 340/679, 684

[56] References Cited

U.S. PATENT DOCUMENTS

| 3,757,501 | 9/1973 | Bennett, Jr. et al. | 56/10.2 J |
|---|---|---|---|
| 3,889,249 | 6/1975 | Bennett, Jr. et al. | 340/684 |
| 3,972,156 | 8/1976 | Bennett, Jr. et al. | 56/10.2 J |
| 4,531,118 | 7/1985 | Beams | 340/684 |
| 4,837,511 | 6/1989 | Whittington et al. | 324/236 |
| 4,854,113 | 8/1989 | Strosser et al. | 56/10.2 J |
| 5,070,682 | 12/1991 | Bohman | 56/10.2 J |

*Primary Examiner*—Terry Lee Melius
*Assistant Examiner*—Heather Shackelford
*Attorney, Agent, or Firm*—Griffin, Butler Whisenhunt & Kutossy

[57] ABSTRACT

A two-channel metal detector system disposed adjacent the crop feed path of a harvester to detect ferrous metal objects in the crop material is provided with both positive and negative adaptive detection thresholds for each channel, the thresholds being independently varied according to the average positive and negative peaks of the noise component in the channel output signals. A channel output signal is sampled and digitized and the positive and negative peaks of the noise component occurring over fixed time intervals are filtered to provide average positive peak and average noise peak values that are stored in an $E^2PROM$ and updated according to long term variations in the noise component. The positive and negative adaptive detection thresholds are set according to the average positive and negative peak values and the adaptive detection thresholds are compared with the sample channel output signal to determine if a ferrous metal object has been detected. By storing the positive and negative average peak values of the noise component in an $E^2PROM$ memory, the adaptive detection thresholds and the filters may be initialized at system start-up to the values existing at the time of system shut-down.

5 Claims, 4 Drawing Sheets

ADAPTIVE THRESHOLDING FOR METAL DETECTION

FIELD OF THE INVENTION

The present invention relates to magnetic metal detectors of the type used in forage harvesters and other crop harvesting equipment. More particularly, the invention relates to a method and apparatus for automatically adapting the sensitivity of a metal detector to account for varying conditions which influence the magnitude of the output signal from the detector.

BACKGROUND OF THE INVENTION

It is conventional to provide a magnetic metal detector adjacent the crop feed path of a harvester for the purpose of detecting the presence of ferrous metal objects picked up from a field with the crop material. Upon detection of a metal object in the crop feed path an output signal is produced to stop the crop feed mechanism before the metal object is fed into a crop cutter mechanism where it could cause considerable damage to the cutter knives and shear bar. Exemplary harvesters with metal detectors are described in U.S. Pat. Nos. 3,757,501, 3,889,249, 3,972,156 and 4,433,528.

The metal detectors must, of necessity, be located close to the crop feed path so that metal objects passing through the feed path may also pass through the magnetic detection field of the detector. As a result, electrical "noise" is introduced into the metal detector by moving metal parts of the harvester which disturb the detection field thereby inducing a noise emf component in the detection coils. U.S. Pat. No. 4,854,113 provides a system wherein much of the cyclically recurring noise produced in a metal detector is cancelled. However, this system does not eliminate non-cyclic noise.

The noise component introduced into a metal detector creates a problem in that it adds to and subtracts from, the detection component in the detection circuits. Generally speaking, the output signal from the detection circuits is compared with threshold values chosen to represent the minimum positive or negative magnitude of the detector output signal when a metal object is detected. If one of these threshold levels is exceeded then the crop feed mechanism is stopped.

Because of the noise component in the detector output signals, the detection threshold levels must be set higher than if the noise component were not present. This effectively reduces the sensitivity of the system and it may not detect metal objects it would otherwise detect. On the other hand, if the threshold levels are set too low, the noise component may cause a false indication that a metal object has been detected.

The problem is further complicated in that the noise component tends to increase as the moving machine parts which cause the noise age and wear. Thus, adaptive thresholding was developed to automatically vary the detection threshold as the noise component in the output signal from the detection circuits increases. U.S. Pat. Nos. 3,757,701 and 3,889,249 disclose a metal detector system with adaptive thresholding for compensating for variations in the noise component. However, in the system disclosed in these patents electronic circuits are required to develop the threshold control signal and this adds to the cost of the system. Furthermore, this prior art system does not provide for adjusting both the positive and negative thresholds. Still further, the prior art system must begin a new development of the threshold levels each time the system is turned on. Thus, at start-up the system may produce a false indication of metal object detection.

SUMMARY OF THE INVENTION

An object of the present invention is to provide a metal detector system wherein the positive and negative detection thresholds for a channel are independently set according to the positive and negative peak averages, respectively, of the noise component of the channel output signal.

A further object of the invention is to provide a metal detector system as described above wherein the positive and negative peak averages are stored in a flash ROM ($E^2$PROM) so that the detection thresholds existing at the time of system shut-down may be re-established at the time of system wake-up.

Another object of the invention is to provide a metal detector system and a method of operating the system by digitizing a channel output signal, determining the positive and negative peaks of the noise component of the channel output signal, filtering the positive and negative peaks of the noise component to obtain positive and negative peak averages of the noise component, and setting positive and negative adaptive detection thresholds according to the positive and negative peak averages, respectively, of the noise component, and comparing the digitized channel output signal with the positive and negative adaptive thresholds to determine if a ferrous metal object has been detected.

Still another object of the invention is to provide a method and apparatus as described above wherein, at system wake-up the filters for filtering the positive and negative peak averages are reset according to the positive and negative peak averages held in an $E^2$PROM at the time of system shut-down.

In a preferred embodiment the adaptive thresholding is accomplished by programming a microcomputer already present in the detection system so that no additional hardware is required.

Other objects and advantages of the invention and the manner of implementing and using it will become evident from the following description and the accompanying drawings.

DESCRIPTION OF A PREFERRED EMBODIMENT

Figure 1:
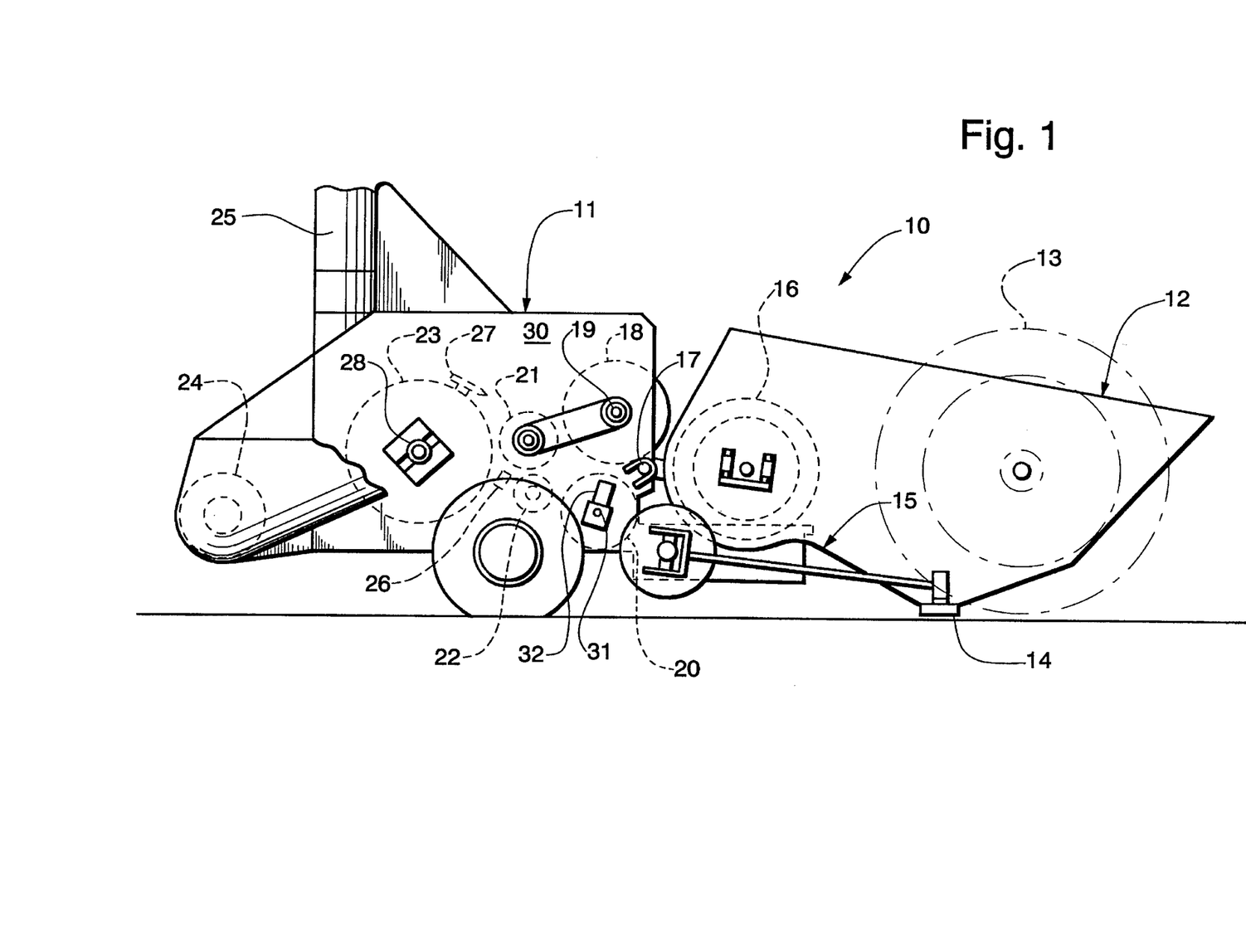
FIG. 1 shows a forage harvester having a magnetic metal detector in a feed roll.

FIG. 1 illustrates a forage harvesting machine of the kind in which the present invention may be employed. It will be apparent that the invention may also be employed with benefit for the protection of other types of farm machinery, and that it has other monitoring and alarm actuating applications aside from protecting farm machinery from damage caused by the ingestion of metal objects. The forage harvester, generally designated by reference numeral 10, comprises a base unit 11 and an attachment 12 for gathering crop material and feeding it to the base unit for processing. Attachment 12 directly cuts crop material in the field and feeds it to base unit 11 where it is chopped and eventually conveyed to a trailing forage wagon (not shown). The attachment 12 includes a reel 13, depicted in phantom, which operates in a conventional manner to guide material over a cutter bar 14 and up an inclined floor 15 to a consolidating auger 16, also depicted in phantom outline. Attachment 12 is pivotally mounted to base unit 11 at 17 and is adapted to feed crop material to the space between upper and lower front reed rolls 18, 20 and then on to upper and lower rear feed rolls 21, 22 which in turn feed material to a cutterhead 23 (shown in phantom) which chops the crop material and guides it rearwardly to conveyor means 24 in a well known manner. The conveyor 24 commonly comprises an auger mounted traversely for feeding the chopped crop material to a blower unit which conveys it upwardly via a vertical spout 25 (partially shown) and then rearwardly to a trailing forage wagon.

The front and rear pairs of upper and lower feed rolls compress into a mat-like configuration the crop material which has been gathered by the attachment and consolidated by auger 16. The mat of material is fed rearwardly across the top surface of a shearbar 26 which is operatively associated with a series of cutting elements 27 (one of which is shown in phantom) on rotating cutterhead 23 journaled for rotation by mounting assembly 28 in sidewall 30 of base unit 11.

A magnetic metal detector system, indicated by numeral 32, is supported on a stationary shaft 31 within the lower front feed roll 20. In a preferred embodiment, the metal detector system comprises a two-channel detector having first and second detection coils 40, 42 (FIG. 2) disposed within a static magnetic detection field generated by suitable means such as permanent or electromagnets (not shown), the detection coils 40, 42 being connected to first and second channels or detection circuits 44, 46, respectively. The arrangement of the detection coils, detection circuits and the magnetic detection field may be as shown in U.S. Pat. No. 4,433,528. The crop feed path extends through the magnetic detection field so that any ferrous metal object passing through the crop feed path disturbs the lines of flux in the detection field. The resulting flux change induces an emf (electromotive force) in the detection coils 40, 42.

Figure 2:
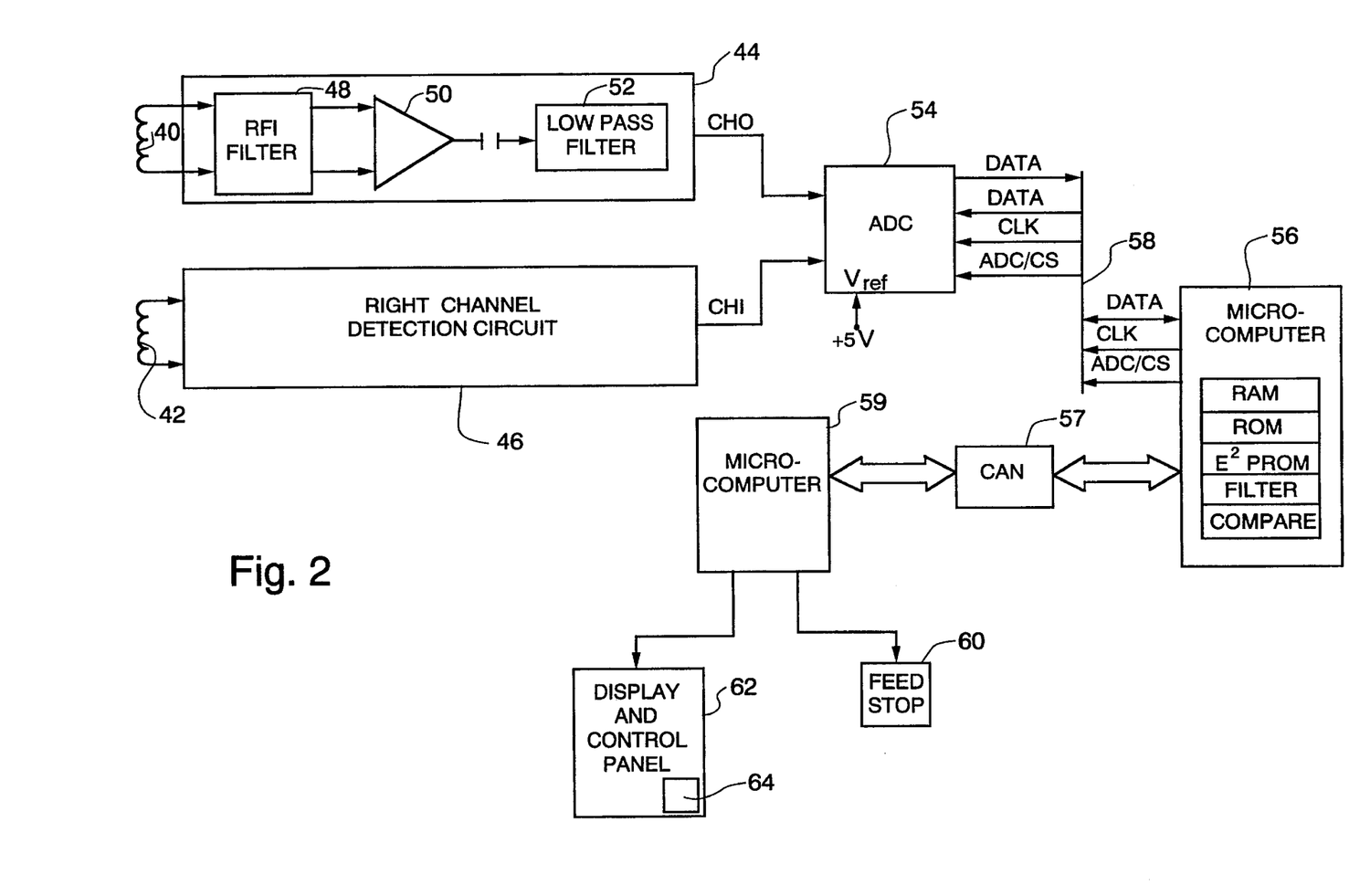
FIG. 2 is a schematic circuit diagram of a two-channel metal detector system.

Detection circuit 44 comprises an RFI filter 48, a differential amplifier 50 and a low pass filter 52. It will be understood that detection circuit 46 includes components like those provided in detection circuit 44 hence only detection circuit 44 will be explained.

The first detection coil 40 is connected to RFI filter 48. The purpose of this filter is to filter out any RF interference induced in detection coil 40. The output of filter 48 is connected to the differential amplifier 50 which amplifies the emf induced in detection coil 40. The output signal from amplifier 50 is applied to the low pass filter 52. The purpose of this filter is to filter out the higher frequency noise component induced in coil 40 by moving ferrous parts of the harvester while passing lower frequency components such as are induced in coil 40 by passage of a metal object through the detection field. The filter 52 cannot filter out all of the noise component from the channel detection signal hence the output signal from detection circuit 44 may have a wave form similar to that shown in FIG. 3 wherein the variations of low amplitude shown in solid line represent unfiltered noise and the larger positive and negative swings shown in phantom represent the sum of unfiltered noise and the signal induced in coil 40 by passage of a metal object through the detection field.

The output signal from filter 52 is the first or left channel output signal CH0 and it is applied to one input of a multi-channel analog to digital converter (ADC) 54. The right channel output signal CH1 is applied to a second input of the ADC.

ADC 54 is controlled by a conventional microcomputer 56 having RAM, ROM and flash ROM ($E^2$PROM) memories and a program controlled microprocessor. The microcomputer is connected to ADC 54 via a serial data link or bus 58. In a typical system the microcomputer 56 is connected via a serial data line 57, which may be a Controller Area Network (CAN) to a further microcomputer 59 which controls a conventional stop means 60 for stopping the crop feed mechanism of the harvester when a tramp metal object is detected in the crop feed path, and to an operator's control panel 62 having manual input keys or switches 64 and an alpha numeric display.

During normal operation, that is, when the metal detector is being operated to sense the passage of tramp metal through the crop feed path, the microcomputer 56 controls ADC 54 to sample the detector channel output signals CH0 and CH1 every 2.5 ms and produce digitized channel output signals which are transferred to the microcomputer 56. The ADC has a resolution of 256 steps (0–255) and is biased at 128. That is, when a detector channel output signal CH0 or CH1 is sampled by the ADC and has a 0 value, the ADC produces the digital value 128.

The detector channel output signals are bipolar. A metal object, either a machine part or tramp metal, entering the magnetic detection field disturbs the flux of the field so that an emf is induced across detection coils 40 and 42 thereby inducing current flows in first directions through the coils, and as the metal object exits from the detection field and the flux returns toward its original state an emf of opposite polarity is induced in each coil causing current flows in second directions through the coils. This causes differential amplifiers 50 in the channel detection circuits 44, 46 to produce output signals exhibiting positive and negative excursions. Thus, the magnitudes of the positive and negative excursions of the output signal from each channel detection circuit must be tested in order to determine if a tramp metal object is passing through the detection field.

Each time a digitized sample of the magnitude of the left channel output signal CH0 is transferred to the microcomputer 56 it is compared with first and second adaptive threshold values ADAPT.LPOSTH and ADAPT.LNEGTH. These threshold values are derived as subsequently described and represent the minimum positive peak amplitude and minimum negative peak amplitude, respectively that the signal CH0 must have for the system to produce a signal indicating detection of a tramp metal object. That is, if the signal CH0 has a positive peak value greater than the first threshold value or a negative peak value greater (more negative) than the second threshold value it is assumed that a tramp metal object has been detected. The microcomputer 56 sends a control signal via serial link 57 to microcomputer 59 which in turn energizes stop means 60 to stop the crop feed.

In like manner the digitized samples of the right channel output signal CH1 are transferred to microcomputer 56 and compared with third and fourth adaptive threshold values ADAPT.RPOSTH and ADAPT.RNEGTH.

Figure 3:
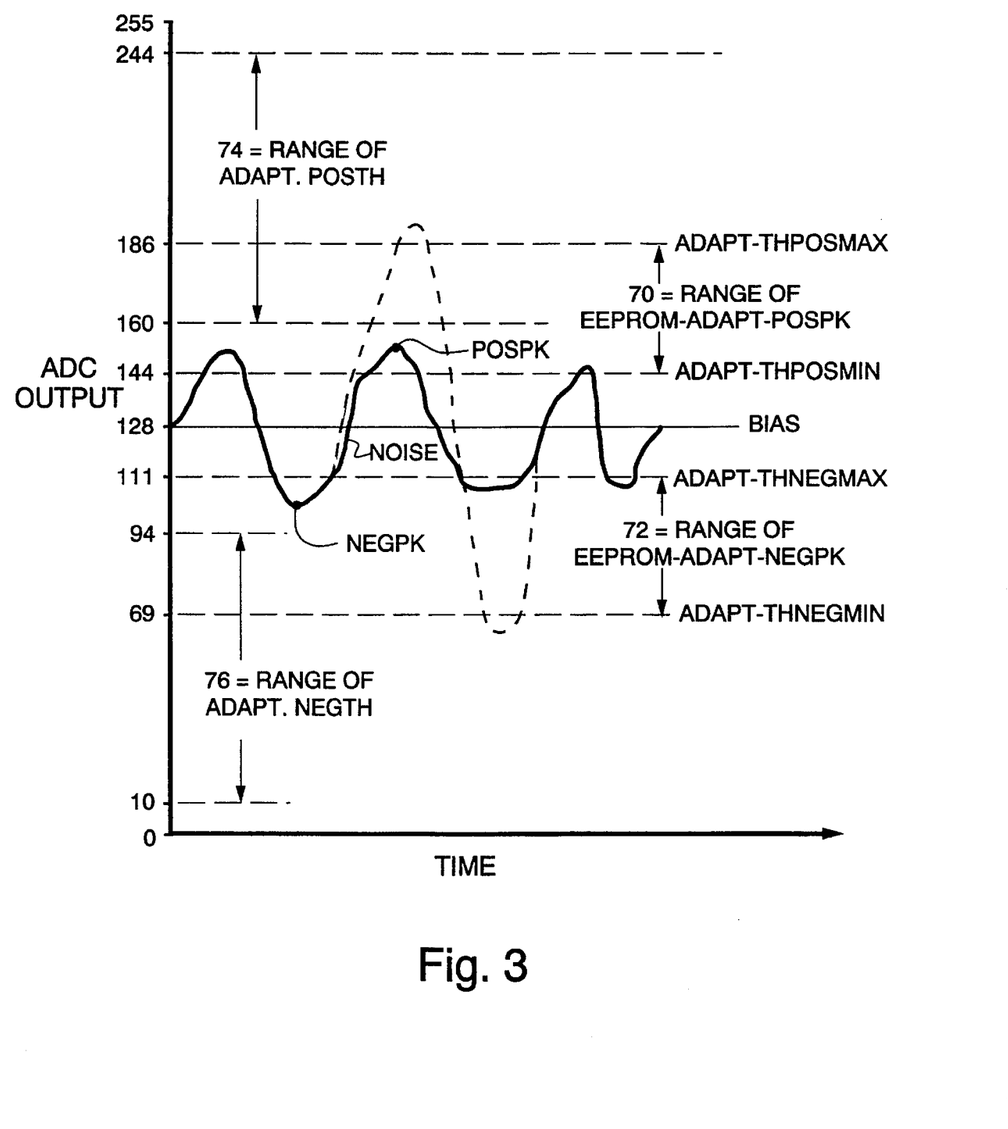
FIG. 3 is a diagram used to explain the relationship between various threshold values and average positive and negative peaks of a channel noise signal; and, FIG. 4 illustrates operations carried out by a microcomputer in executing an Adapt_Main1 routine.

Because the waveform of FIG. 3 is typical of both the right and left channel output signals, the right or left designation has been left out of the designations. Thus, ADAPT.POSTH in FIG. 3 may be either ADAPT.RPOSTH or ADAPT.LPOSTH.

It is desirable on one hand to set the positive and negative adaptive thresholds ADAPT.POSTH and ADAPT.NEGTH as close as possible to the no-signal state. This enhances the ability of the system to detect small metal objects since the output signal from a channel is dependent in part on the size of the object detected. Stated differently, the sensitivity of a detector channel is increased as the adaptive thresholds are set closer to the no-signal level.

On the other hand, the noise component of the channel output signal limits how close the adaptive threshold levels may be to the no-signal level. If the adaptive thresholds are set too low a peak of the noise component may exceed a threshold level and thus result in a false indication that a tramp metal object has been detected. The threshold levels must be selected to provide a safety margin between the threshold levels and the peaks of the noise components. However, as the metal parts of the harvester wear and introduce a larger noise component into the channel output signal this safety margin may be exceeded so that object detection may be falsely indicated.

In the present invention the adaptive detective thresholds with which the digitized channel output signals are compared are varied or adapted to take into account long term variations in the average peak magnitudes, positive and negative, of the noise components in each channel.

Referring again to FIG. 3, the microcomputer 56 establishes the adaptive detection threshold levels for one channel by taking 2500 samples of the noise component of the channel output signal and determining the positive peak (POSPK) and negative peak (NEGPK) of the noise component during the sampling interval (6.25 ms). The positive and negative peaks are then averaged by two single pole low pass filters to develop two values EEPROM_ADAPT_NEGPK and EEPROM_ADAPT_POSPK representing the average negative and positive peak values of the noise component over a long interval on the order of 8 minutes. The average positive peak value of the noise component is limited to the range indicated at 70 in FIG. 3 and the average negative peak value of the noise component is limited to the range indicated at 72 in FIG. 3.

Once microcomputer 56 determines the average positive peak value of the channel signal noise component the positive adaptive detection threshold ADAPT.POSTH is set at twice the average positive peak value of the noise component. This provides a tolerance factor so that the noise component will not cause a false object detection indication if a given peak of the noise component is considerably higher than the average peak. Since the positive adaptive detection threshold is set at twice the average positive peak noise, and the average positive peak noise may vary within the range 70, the positive adaptive detection threshold ADAPT.POSTH may vary over the range 74, rising as the average positive peak noise rises and dropping to a lower level as the average positive peak noise drops.

Similarly, the negative adaptive threshold ADAPT.NEGTH is set at twice the average negative peak value of the channel noise component and varies as the average negative peak noise varies.

By individually adjusting the positive and negative adaptive detection thresholds according to variations in the average peak positive and negative noise components, the adaptive detection thresholds are set as close as possible to the no-signal level (bias in FIG. 3) thus enabling the sensitivity of the detector to be maintained at the highest level permitted by the current noise levels.

Microcomputer 56 executes three routines ADAPT_INIT, ADAPT MAIN and ADAPT_MAIN1 as set forth in the attached appendix to set the four adaptive detection thresholds ADAPT.LPOSTH, ADAPT.LNEGTH, ADAPT.RPOSTH and ADAPT.RNEGTH with which detector channel output signals are compared with in order to determine if a tramp metal object has been detected. ADAPT_INIT is executed when power is turned on and initializes certain variables. Four average peak noise values EEPROM_ADAPT_LPOSPK, EEPROM_ADAPT_LNEGPK, EEPROM_ADAPT_RPOSPK and EEPROM_ADAPT_RNEGPK are retrieved from the $E^2PROM$, multiplied by 16, and entered into the filter registers LPOSF, LNEGF, RPOSF and RNEGF. As will become evident from the following description, one of these values is updated in the $E^2PROM$ when the average peak noise, either positive or negative from a channel, varies by a predetermined amount so that at system shut-down the $E^2PROM$ holds the average peak noise values last produced by the long term filters. This restores the filter registers to the values last read from the registers before power shut-off.

Next, the microcomputer 56 loads the value 81 into a register ADAPT.SENSE. In this regard keys, represented at 64 in FIG. 2, are provided on the operator's control panel 62 so that the operator may add an offset or sensitivity value to the computer determined threshold values LPOSTH, LNEGTH, RPOSTH and RNEGTH. The offset is equal to 9 times (X−1) where X is the value keyed in by the operator. Maximum sensitivity is obtained when the value 9 is keyed in hence loading the value 81 into ADAPT.SENS in effect selects maximum sensitivity.

After ADAPT.SENS is loaded, the microcomputer initializes the adaptive detection thresholds ADAPT.LPOSTH, ADAPT.LNEGTH, ADAPT.RPOSTH and ADAPT.RNEGTH with which detection signals from the metal detector are compared. The thresholds are set to a value equal to twice the respective average peak noise plus the value of ADAPT.SENS provided the value does not exceed a maximum allowable threshold value. If the value exceeds the maximum allowable threshold value then the threshold is set to the maximum value.

The average peak noise values EEPROM_ADAPT_LPOSPK, EEPROM_ADAPT_LNEGPK, EPROM_ADAPT_RPOSPK and EEPROM_ADAPT_RNEGPK are retrieved from the $E^2PROM$ memory, multiplied by two and entered into threshold registers LPOSTH, LNEGTH, RPOSTH and RNEGTH, respectively.

Next, ADAPT.SENS is added to each of the values in LPOSTH, LNEGTH, RPOSTH and RNEGTH. Four threshold limit values, ADAPT_THPOSMAX, ADAPT_THPOSMIN, ADAPT_THNEGMAX and ADAPT_THNEGMIN, all offsets from the bias level 128, are then retrieved from non-volatile memory. These latter values represent the maximum and minimum, positive and negative values which the adaptive detection thresholds may have. Typical values are shown in FIG. 3 for purposes of illustration only. Each threshold limit value is multiplied by two and compared with the sum of ADAPT.SENS and the contents of one of the threshold registers LPOSTH, LNEGTH, RPOSTH or RNEGTH, all offsets from the bias level 128.

ADAPT_THPOSMAX is multiplied by two and compared to the sum of ADAPT.SENS and LPOSTH. If ADAPT.SENS plus LPOSTH is greater than ADAPT_

THPOSMAX*2 then the adaptive ADAPT.LPOSTH is set to ADAPT_THPOSMAX*2 but if ADAPT.SENS plus LPOSTH is less than ADAPT_THPOSMAX*2+128 then ADAPT.LPOSTH is set to LPOSTH+ADAPT.SENS+128.

ADAPT_THNEGMAX is multiplied by two and compared with the sum of ADAPT_SENS and LNEGTH. If ADAPT.SENS plus LNEGTH is greater than ADAPT_THNEGMAX*2 then the adaptive threshold ADAPT.LNEGTH is set to 128-ADAPT_THNEGMAX*2 but if ADAPT THNEGMAX*2 is greater than ADAPT.LNEGTH is set to 128-LNEGTH-ADAPT.SENS.

From the above description it is seen that on system wake-up the routine ADAPT_INIT restores the filter registers to the values they held at system shut-down and also establishes the adaptive detection thresholds according to the average peak filter values (noise) at the time of system shut-down, taking into account any change in ADAPT.SENS made by the operator. The graph of FIG. 3 is drawn with the assumption that the operator-determined sensitivity factor is zero.

The routine ADAPT_MAIN routine is called every 2.5 ms on an interrupt basis. When the routine is entered, two registers LEFT an RIGHT hold the last digitized samples of the left and right channel output signals. ADAPT_MAIN detects the positive and negative machine noise peaks POSPK, NEGPK (FIG. 3) for each channel. The peak values are derived over a period of 6.25 sec from 2500 digitized samples of each channel output signal. The peak detection is qualified. If a channel output signal sample exceeds the current positive or negative adaptive threshold for that channel, it is assumed that the signal was generated by detection of a tramp metal object, not noise, and the signal is ignored. If the channel output signal sample is below a current minimum fixed threshold for that channel (stored in ROM), the signal is ignored on the assumption that the crop feed is not running. The qualification, in effect, eliminates from the sampling process all except noise signals within the range of magnitudes of noise signals occurring when the crop feed mechanism is running.

Figure 4:
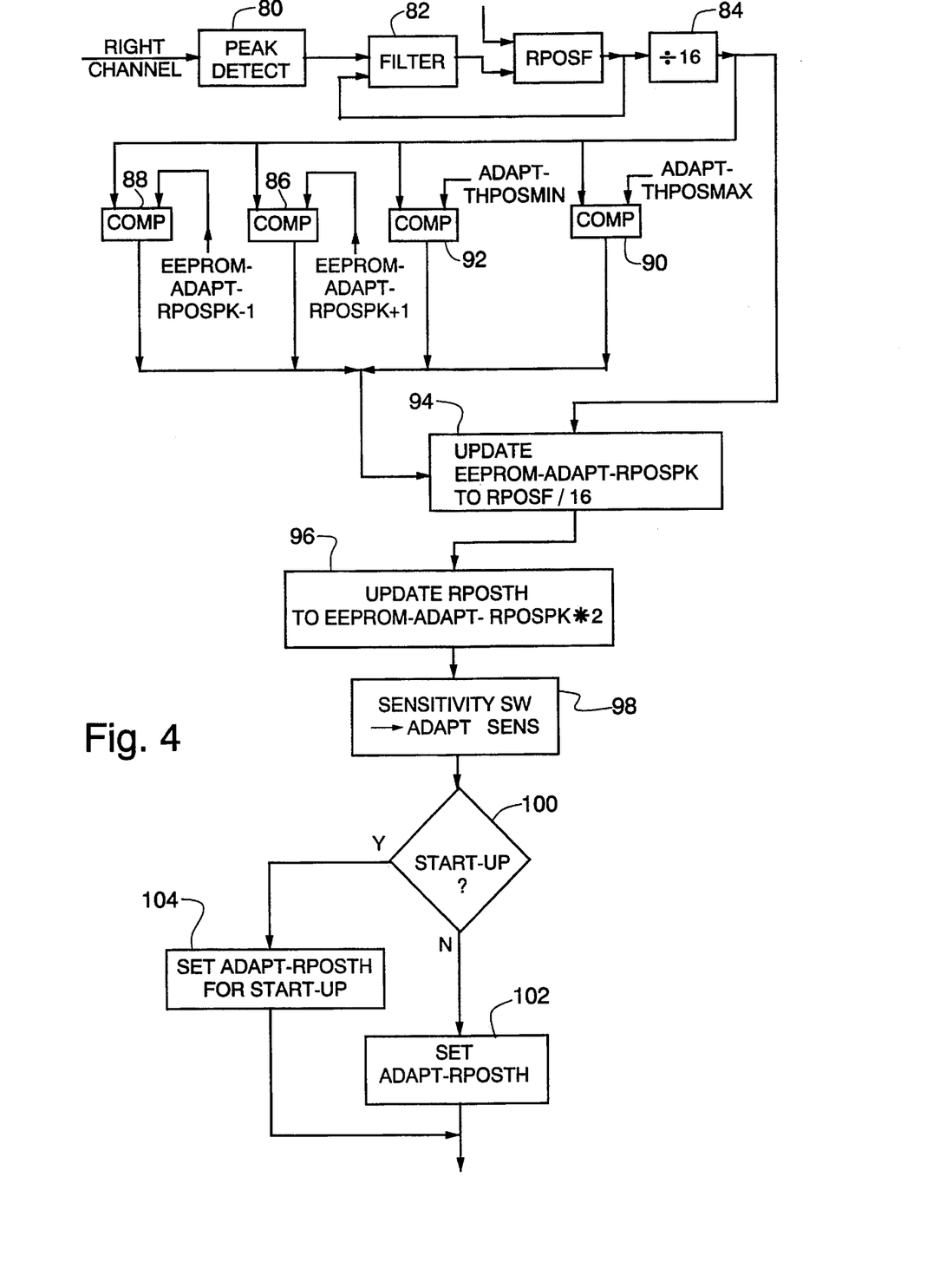

The routine ADAPT_MAIN1 is called on a non-interrupt basis about every 5 ms. The routine implements the four filters referred to above for filtering or long term (approximately 8 min) averaging of the positive and negative noise peaks of each channel determined during execution of ADAPT_MAIN. FIG. 4 schematically illustrates only the operations carried out with respect to the positive peak noise signals for the right channel. Similar operations are carried out with respect to the positive and negative peak noise signals for both channels.

In FIG. 4, the positive peak noise signals derived from peak detector 80 (implemented in ADAPT_MAIN) are applied to a filter 82 which averages the long term trend of the positive peak machine noise signals according to the formula:

$$\text{Filter Value}_{(t)} = \frac{1}{2}\text{Sample}_{(t)} + 31/32 \times \text{Filter Value}_{(t-1)}$$

The output of the filter is held in a register RPOSF. As previously explained, ADAPT_INIT loads this register with EEPROM_ADAPT_RPOSPK on wake-up so that the long term filtering may continue from the point where it was interrupted at shut-down. The output of RPOSF is fed back to the filter to accomplish the averaging function.

The output of RPOSF is also divided by 16 as indicated at 84 and applied to comparators 86, 88, 90 and 92. Comparator 86 compares RPOSF/16 with EEPROM_ADAPT_RPOSPK+1 and comparator 88 compares RPOSF/16 with EEPROM_ADAPT_RPOSPK−1. Comparators 90 and 92 compare RPOSF/16 with ADAPT_THPOSMAX and ADAPT_THPOSMIN, respectively. If RPOSF/16 is greater than EEPROM_ADAPT_RPOSPK+1 or less than EEPROM_ADAPT_RPOSPK−1, or equal to ADAPT_THPOSMAX or ADAPT_THPOSMIN, EEPROM_ADAPT_RPOSPK is updated by loading it with RPOSF/16 (step 94).

The positive threshold register RPOSTH is then updated to EEPROM_ADAPT_RPOSPK*2 at step 96. Next, the operator sensitivity switch is sampled at step 98.

Step 100 determines from the digitized channel output signal if the crop feed mechanism has been engaged. As explained in my concurrently filed application Ser. No. 08/414,328 entitled Compensation For Start-Up Transients, incorporated hereby by reference, the adaptive thresholds are set higher than normal during the interval the crop feed mechanism is accelerating because of the higher noise component in the channel output signals resulting from the accelerating parts of the mechanism. Step 104 accomplishes this function.

Assuming that the crop feed mechanism is not accelerating, positive adaptive detection threshold ADAPT.RPOSTH for the right channel is set at step 102. If RPOSTH+ADAPT.SENS is greater than ADAPT_THPOSMAX*2 then ADAPT.RPOSTH is set to ADAPT_THPOSMAX*2+128 and if it is not greater then ADAPT.RPOSTH is set to RPOSTH+128+ADAPT.SENS.

The negative adaptive threshold for the right channel and the positive and negative thresholds for the left channel are adaptively set in substantially the manner described above. With respect to the negative thresholds the threshold is set at step 100 to 128-ADAPT_THNEGMAX*2 if the subtraction of RNEGTH-ADAPT.SENS (or LNEGTH-ADAPT.SENS is greater than ADAPT_THNEGMAX*2, and to 128-LNEGTH+ADAPT.SENS) (or 128-RNEGTH-ADAPT.SENS) if not.

Once an adaptive detection threshold ADAPT.RPOSTH, ADAPT.RNEGTH, ADAPT.LNEGTH or ADAPT.LPOSTH is updated it is used for comparison with all subsequent sample signals derived from its associated channel by ADC 54.

From the foregoing description it is evident that a metal detector constructed according to the invention exhibits greater sensitivity in the detection of tramp metal objects while at the same time producing fewer false indications of object detection. Two factors make this possible. First, both the positive and negative detection thresholds for each channel are varied according to long term changes of the noise component in the channel signal so that both detection thresholds are kept as close as possible to the no-signal level, thereby maintaining maximum sensitivity. Secondly, the average peak noise components are saved in an $E^2$PROM so that at system start-up the detection thresholds and the peak averaging circuits may be set to the same values they had at system shut-down.

Although a preferred embodiment has been described in detail by way of example it will be understood that various modifications may be made in the described embodiment without departing form the spirit and scope of the invention as defined by the appended claims. For example, it is not necessary that a detection threshold be set at twice the average noise signal. Other full or fractional multiples of the noise signal may be used. Alternatively, detection threshold may be established by adding a constant value to the value of the noise signal.

COMPUTER PROGRAM LISTING
/*******************************************************************

TITLE:        Adapt.c

DESCRIPTION:  Derives adaptive threshold settings from input
              waveform measurements. The input waveforms (Left
              Channel and Right Channel) are monitored over an
              interval defined by Core_MS_PER_SCAN * SAMPLE_TIME.
              The (4) peak values occurring during this interval (
              Left Channel +, Left Channel-, Right Channel +, and
              Right Channel-) are input to a (4) filters.
              The filters have a rise time of ___ Sec.
              The output of the filters are compared
              to the previous filter values. If a filter value
              changes by (2) or greater, the corresponding threshold
              is updated using the following formulas:

1) For filter values > DC bias value:
                     threshold = ((filter value - DC bias value)
                                * 2) + DC bias.
              2) For filter values <    DC bias value:
                     threshold = DC bias - ((DC bias value
                                  - filter value)*2)

Thus, (4) thresholds are derived:
              Left Channel +, Left Channel -, Right Channel +, and
              Right Channel -.
              Upper and lower bounds are established for the
              thresholds. The maximum "+" threshold is defined by
              Adapt_THPOSMAX and is set @ 0xba. The minimum "+"
              threshold is defined by Adapt_THNEGMAX and is set @
              0x90. The maximum "-" threshold is defined by
              Adapt_THNEGMAX and is set @ 0x6f. The minimum "-"
              threshold is defined by Adapt_THNEGMIN and is set @
              0x45.

A state machine approach is implemented.

*******************************************************************
/*******************************************************************
Reference Files
*******************************************************************/

```
#include "Adapt.h"
#include "Bit.h"
#include "CAN.h"
#include "Detect.h"
#include "EEProm.h"
#include "Serial.h"
/************************************************************************
Variables Global Scope
*************************************************************************/
    struct Adapt_sl Adapt;
/************************************************************************
Definitions: Module Scope
*************************************************************************/
    /*
    state declarations
    */
            #define WAKEUP          0
            #define SAMPLE          1
            #define LPOS_FILTER     3
            #define LNEG_FILTER     4
            #define RPOS_FILTER     5
            #define RNEG_FILTER     6
            #define LPOS_UPDATE     7
            #define LNEG_UPDATE     8
            #define RPOS_UPDATE     9
            #define RNEG_UPDATE     10
            #define WAIT1           11
            #define CAN_INFO        12
            #define LPOS_SENS       13
            #define LNEG_SENS       14
            #define RPOS_SENS       15
            #define RNEG_SENS       16
/************************************************************************
Variables: Module Scope
*************************************************************************/
    static unsigned char xdata lpos;
    static unsigned char xdata lpospk;
    static unsigned int xdata lposf;
    static unsigned char xdata lposth;

static unsigned char xdata lneg;
    static unsigned char xdata lnegpk;
    static unsigned int xdata lnegf;
    static unsigned char xdata lnegth;

static unsigned char xdata rpos;
    static unsigned char xdata rpospk;
    static unsigned int xdata rposf;
    static unsigned char xdata rposth;

static unsigned char xdata rneg;
```

```
static unsigned char xdata megpk;
static unsigned int xdata megth;
static unsigned char xdata megf;

static unsigned char xdata state;
static unsigned int xdata timer0, timer1;
    #define TIMER1_INIT   1000
```

/*******************************************************************************
Functions: Global Scope
*******************************************************************************/
/*******************************************************************************

TITLE:          void Adapt_Init(void)

DESCRIPTION:   Initializes variables on power-up.

Filter outputs (lpos, lneg, rpos and meg) are
                    initialized to previous values (EEprom_Adapt_lpospk,
                    EEprom_Adapt_lnegpk, EEprom_Adapt_rpospk and
                    EEprom_Adapt_megpk) stored in EEprom.

Thresholds (Adapt.lposth, Adapt.lnegth, Adapt.rposth
                    and Adapt.megth) are initialized using the following
                    formulas:
                        1) For filter values > DC bias value:
                            threshold = ((filter value - DC bias value)
                                *2) + DC bias.
                        2) For filter values < DC bias value:
                            threshold = ((DC bias value
                                - filter value)*2).
*******************************************************************************/

```
    void Adapt_Init (void)
    {
        lposf = (unsigned int)EEprom_Adapt_lpospk*16;
        lnegf = (unsigned int)EEprom_Adapt_lnegpk*16;
        rposf = (unsigned int)EEprom_Adapt_rpospk*16;
        megf = (unsigned int)EEprom_Adapt_megpk*16;

/*
    /*
        /*
        Set thresholds to max. On wakeup...when CAN info arrives value
        will be updated.
        */
            Adapt.sens = 81;

lposth = EEprom_Adapt_lpospk*2;
        if
        (
            ((unsigned int)lposth + (unsigned int)Adapt.sens)
          >   Adapt_THPOSMAX*2
```

```
                )
                        Adapt.lposth = Adapt_THPOSMAX*2 + 128;
        else
                        Adapt.lposth = lposth + Adapt.sens + 128;

lnegth = EEprom_Adapt_lnegpk*2;
        if
        (
                        ((unsigned int)lnegth + (unsigned int)Adapt.sens)
                >       Adapt_THNEGMAX*2
        )
                        Adapt.lnegth = 128 - Adapt_THNEGMAX*2;
        else
                        Adapt.lnegth = 128 - lnegth + Adapt.sens;

rposth = EEprom_Adapt_rpospk*2;
        if
        (
                        ((unsigned int)rposth + (unsigned int)Adapt.sens)
                >       Adapt_THPOSMAX*2
        )
                        Adapt.rposth = Adapt_THPOSMAX*2 + 128;
        else
                        Adapt.rposth = rposth + Adapt.sens + 128;

rnegth = EEprom_Adapt_rnegpk*2;
        if
        (
                        ((unsigned int)rnegth + (unsigned int)Adapt.sens)
                >       Adapt_THNEGMAX*2
        )
                        Adapt.rnegth = 128 - Adapt_THNEGMAX*2;
        else
                        Adapt.rnegth = 128 - rnegth - Adapt.sens;
}
/******************************************************************************
        TITLE:          void Adapt_Main
                        (
                          unsigned char left,
                          unsigned char right
                        )
        PASSED INFO:    Latest left and right channel input samples.

DESCRIPTION:    This function is called Detect_Main(). It
                        implements a state driven machine in conjunction with
                        Adapt_Main1(). Adapt_Main1() is called from main() (
                        located in EMD.c). Adapt_Main() handles the peak
                        detections and qualification of the peak readings. It
                        also handles the timing for the processing of the peak
                        readings, which occurs once every
```

```
                        Core_MS_PER_SCAN*SAMPLE_TIME.
                        Off-line (non-interrupt) processing is handled by
                        Adapt_Main1(), due to processing time requirements
                        exceeding time available during interrupt 6. Note:
                        Detect_Main() is called from Core_PCA_Intrpt()
                        interrupt 6.
*****************************************************************************/
        void Adapt_Main (unsigned char left, unsigned char right)
        {
           /*
           Definitions: Function Scope
           */
                #define SAMPLE_TIME 2500
           /*

/*
           Get peak values
           */
                if (left > lpos)
                    lpos = left;
                else if (left < lneg)
                    lneg = left;

if (right > rpos)
                    rpos = right;
                else if (right < rneg)
                    rneg = right;

if (left > Adapt.lpos)
                    Adapt.lpos = left;
                else if (left < Adapt.lneg)
                    Adapt.lneg = left;

if (right > Adapt.rpos)
                    Adapt.rpos = right;
                else if (right < Adapt.rneg)
                    Adapt.rneg = right;

switch state)
            {
                /*
                Sample at approx. .2 Hz rate
                */
                    case WAKEUP:
                    {
                        lpos = lneg = rpos = rneg = 128;
                        timer0 = SAMPLE_TIME;
                        state = Sample;
                    }
```

```
                break;

case SAMPLE:
            {
                if (timer0 != 0)
                    - timer0;
                else
                {
                    if
                    (
                            lpos > Adapt_THPOSMAX + 128
                        ||  lpos < Adapt_THPOSMIN + 128
                        ||  lneg < 128 - Adapt_THNEGMAX
                        ||  lneg > 128 - Adapt_THNEGMIN
                        ||  rpos > Adapt_THPOSMAX + 128
                        ||  rpos < Adapt_THPOSMIN + 128
                        ||  rneg < 128 - Adapt_THNEGMAX
                        ||  rneg > 128 - Adapt_THNEGMIN state = CAN INFO;
                    else
                    {
                        lpospk = lpos - 128;
                        lnegpk = 128 - lneg;
                        rpospk = rpos - 128;
                        rnegpk = 128 - rneg;
                        state = WAIT1;
                    }
                }
            }
            break;
        }
    }
/**************************************************************************
    TITLE:          void Adapt_Main1 (void)

DESCRIPTION:    This function is called from main() located in EMD.c
                    ). It implements a state driven machine
                    in conjunction with Adapt_main(). Adapt_Main1 handles
                    off-line (non-interrupt) processing of new peak
                    readings. Note: Only (1) state is processed per call to
                    minimize scan time usage. Filters (lposf, lnegf,
                    rposf, rnegf) are updated with new peak reading
                    samples (lpospk, lnegpk, rpospk, rnegpk).

The output of the filters (lposf, rposf, lnegf, rnegf)
                    are compared to the previous values (
                    EEprom_Adapt_lpospk, EEprom_Adapt_lnegpk,
                    EEprom_Adapt_rpospk and EEprom_Adapt_rnegpk). If a
                    filter value changes by (2) or greater, the
```

-24-

```
                        corresponding threshold is updated using the following
                        formulas:
                            1) For filter values > DC bias value:
                                threshold = ((filter value - DC bias value)
                                        *2) + DC bias.
                            2) For filter values < DC bias value:
                                threshold = DC bias - ((DC bias value
                                        - filter value)*2).
************************************************************************/
        unsigned char Adapt_Main1(void)
        {
            /*
            If any analog switch is on...no need to run adapt
            /*
                if ((Bit_Output & Bit_Output_SWS))
                    return(1);
            /*
            Update Filters: Multiplex to conserve time resource.
            Note: Filters are prescaled by 16 to provide fractional
                    information.
            */
                switch (state)
                {
                    case WAIT1:
                        state = LPOS_FILTER;
                    break;
                    case LPOS_FILTER:
                    {
                        lposf = (unsigned char)lpospk/2 + lposf - lposf/32;
                        state = LNEG_FILTER;
                    }
                    break;
                    case LNEG_FILTER:
                    {
                        lnegf = (unsigned char)lnegpk/2 + lnegf - lnegf/32;
                        state = RPOS_FILTER;
                    }
                    break;
                    case RPOS_FILTER:
                    {
                        rposf = (unsigned char)rpospk/2 + rposf - rposf/32;
                        state = RNEG_FILTER;
                    }
                    break;
                    case RNEG_FILTER:
                    {
                        rnegf = (unsigned char)rnegpk/2 + rnegf - rnegf/32;
                        state = LPOS_UPDATE;
                    }
                    break;
                    case LPOS_UPDATE:
```

```
{
    if
    (
          lposf/16 > EEprom_Adapt_lpospk + 1
       || lposf/16 = Adapt_THPOSMAX
       || lposf/16 < EEprom_ADAPT_lpospk - 1
       || lposf/16 = Adapt_THPOSMIN
    )
    {
      EEprom_Adapt_lpospk = lposf/16;
       lposth = EEprom_Adapt_lpospk*2;
    }
    state = LNEG_UPDATE;
}
break;
case LNEG_UPDATE:
{
    if
    (
          lnegf/16 > EEprom_Adapt_lnegpk + 1
       || lnegf/16 = Adapt_THNEGMAX
       || lnegf/16 < EEprom_ADAPT_lnegpk - 1
       || lnegf/16 = Adapt_THNEGMIN
    )
    {
      EEprom_Adapt_lnegpk = lnegf/16;
       lnegth = EEprom_Adapt_lnegpk*2;
    }
    state = RPOS_UPDATE;
}
break;
case RPOS_UPDATE:
{
    if
    (
          rposf/16 > EEprom_Adapt_rpospk + 1
       || rposf/16 = Adapt_THPOSMAX
       || rposf/16 < EEprom_ADAPT_rpospk - 1
       || rposf/16 = Adapt_THPOSMIN
    )
    {
      EEprom_Adapt_rpospk = rposf/16;
       rposth = EEprom_Adapt_rpospk*2;
    }
    state = RNEG_UPDATE;
}
break;
case RNEG_UPDATE:
{
    if
    (
          rnegf/16 > EEprom_Adapt_rnegpk + 1
       || rnegf/16 = Adapt_THNEGMAX
       || rnegf/16 < EEprom_ADAPT_rnegpk - 1
```

```
            ||  megf/16 = Adapt_THNEGMIN
        )
        {
          Eeprom_Adapt_megpk = megf/16;
          megth = EEprom_Adapt_megpk*2;
        }
        state = CAN_INFO;
  }
  break;
  case CAN_INFO:
      if
      (
              CANObjs_RxHost_bi[0]&0xf0 = 0
          && CANObjs_RxHost_bi[0]&0x01 = 0
      )
      {
          Adapt.sens = (CANObjs_RxHost_bi[0] - 1)*9;
          if (Adapt.sens > 81)
              Adapt.sens - 81;
      }
      else
      {
          if (CANObjs_RxHost_bi[0] = 0x5a
              Adapt.init = 1
      }
      state = LPOS_SENS;
  break;
  case LPOS_SENS:
      if
      (
              ((unsigned int)lposth + (unsigned int)Adapt.sens)
          >   Adapt_THPOSMAX*2
      )
              Adapt.lposth = Adapt_THPOSMAX*2 + 128;
      else
              Adapt.lposth = lposth + 128 + Adapt.sens;

Detect.xmit[Detect_ADAPT_LPOSTH_BYTE] = Adapt.lposth;
      state = LNEG_SENS;
  break;
  case LNEG_SENS:
      if
      (
              ((unsigned int)lnegth + (unsigned int)Adapt.sens)
          >   Adapt_THNEGMAX*2
      )
              Adapt.lnegth = 128 - Adapt_THNEGMAX*2;
      else
              Adapt.lnegth = 128 - lnegth - Adapt.sens;

Detect.xmit[Detect_ADAPT_LNEGTH_BYTE] = Adapt.lnegth;
      state = RPOS_SENS;
  break;
  case RPOS_SENS:
```

```
        if
        (
                ((unsigned int)rposth + (unsigned int)Adapt.sens)
            >   Adapt_THPOSMAX*2
        )
                Adapt.rposth = Adapt_THPOSMAX*2 + 128;
        else
                Adapt.rposth = rposth + Adapt.sens + 128;

Detect.xmit[Detect_ADAPT_RPOSTH_BYTE] = Adapt.rposth;
        state = RNEG_SENS;
    break;
    case RNEG_SENS:
        if
        (
                ((unsigned int)rnegth - (unsigned int)Adapt.sens
            >   Adapt_THNEGMAX*2

)
                Adapt.rnegth = 128 - Adapt_THNEGMAX*2;
        else
                Adapt.rnegth = 128 -rnegth - Adapt.sens;

Detect.xmit[Detect_ADAPT_RNEGTH_BYTE] = Adapt.rnegth;
           state = WAKEUP;
    break;
   }
 }
```

I claim:

1. A metal detector system for detecting the passage of metal objects through a magnetic detection field, said metal detector system including at least one channel comprising a detection coil disposed in said magnetic detection field and a detection circuit for producing a channel output signal having a noise component therein, said channel output signal including a detection component upon the passage of a ferrous metal object through said magnetic detection field; means for sampling said channel output signal and producing digitized channel signals, means for comparing said digitized channel signals with positive and negative adaptive thresholds and producing an output indication when one of said digitized channel signals exceeds either said positive or said negative adaptive threshold, and means for producing positive and negative peak averages and independently setting said positive and negative adaptive thresholds according to the positive peak average and the negative peak average, respectively, of said noise component.

2. A metal detector as claimed in claim 1 wherein said means for setting said positive and negative adaptive thresholds comprises positive and negative peak detectors for detecting positive and negative peaks of said noise component, filter means for developing positive and negative average peak noise values from said positive and negative peaks, and means for setting said positive and negative adaptive thresholds according to said positive and negative average peak noise values, respectively.

3. A metal detector system for detecting the passage of metal objects through a magnetic detection field, said metal detector system including at least one channel comprising a detection coil disposed in said magnetic detection field and a detection circuit for producing a channel output signal having a noise component therein, said channel output signal including a detection component upon the passage of a ferrous metal object through said magnetic detection field; means for sampling said channel output signal and producing digitized channel signals, means for comparing said digitized channel signals with positive and negative adaptive thresholds and producing an output indication when one of said digitized channel signals exceeds either said positive or said negative adaptive threshold, means for independently setting said positive and negative adaptive thresholds according to the positive peak average and the negative peak average, respectively, of said noise component, said means for setting said positive and negative adaptive thresholds comprising positive and negative peak detectors for detecting positive and negative peaks of said noise component, filter means for developing positive and negative average peak noise values from said positive and negative peaks, and means for setting said positive and negative adaptive thresholds according to said positive and negative average peak noise values, respectively, and an $E^2PROM$ for storing said positive and negative average peak noise values and means operative at system wake-up for setting said positive and negative adaptive thresholds according to the positive and negative average peak noise values in said $E^2PROM$ at system shut-down.

4. A metal detector as claimed in claim 3 wherein said filter means comprises first and second filters, having first and second registers, and means operative at system wake-up for setting said first and second registers according to the positive and negative average peak noise values, respectively, in said $E^2PROM$ at system shut-down.

5. A method of operating a metal detector system that detects the passage of metal objects through a magnetic detection field, the metal detector system including at least one channel comprising a detection coil disposed in the magnetic detection field, and a detection circuit for producing a channel output signal having a noise component therein, said channel output signal including a detection component upon the passage of a ferrous metal object through the magnetic detection field, said method comprising:

sampling said channel output signal and producing digitized channel signals;

comparing the digitized channel signals with positive and negative adaptive thresholds and producing an indication when one of the digitized channel signals exceeds either the positive or the negative adaptive threshold; and, producing positive and negative peak averages and independently adjusting the positive and negative thresholds according to the positive peak average and negative peak average, respectively, of the noise component.

* * * * *